US009041547B2

(12) United States Patent
Hartmann (10) Patent No.: US 9,041,547 B2
(45) Date of Patent: May 26, 2015

(54) SYSTEM AND METHOD FOR STICK-SLIP CORRECTION (75) Inventor: Andreas Hartmann, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 882 days.

(21) Appl. No.: 13/219,125

(22) Filed: Aug. 26, 2011

(65) Prior Publication Data

US 2013/0049982 A1 Feb. 28, 2013

(51) Int. Cl.
*E21B 47/04* (2012.01)
*E21B 47/00* (2012.01)
*E21B 47/024* (2006.01)
*G06F 17/18* (2006.01)
*E21B 45/00* (2006.01)
*E21B 49/00* (2006.01)
*E21B 44/00* (2006.01)
*E21B 47/12* (2012.01)
*E21B 44/08* (2006.01)

(52) U.S. Cl.
CPC .............. *E21B 47/00* (2013.01); *E21B 47/04* (2013.01); *E21B 47/024* (2013.01); *G06F 17/18* (2013.01); *E21B 45/00* (2013.01); *E21B 49/003* (2013.01); *E21B 44/00* (2013.01); *E21B 47/12* (2013.01); *E21B 44/08* (2013.01); *E21B 44/005* (2013.01); *E21B 47/124* (2013.01)

(58) Field of Classification Search
CPC ....... E21B 44/00; E21B 44/005; E21B 44/08; E21B 45/00; E21B 47/024; E21B 47/12; E21B 47/124; E21B 49/003; E21B 47/04
USPC ........ 340/853.1, 853.3, 853.6, 854.1, 870.04; 172/6, 11; 73/152.01, 152.02, 152.03, 73/152.44; 367/27
See application file for complete search history.

(56) References Cited

U.S. PATENT DOCUMENTS

| | | | |
|---|---|---|---|
| 5,415,030 A | 5/1995 | Jogi et al. | |
| 5,519,668 A | 5/1996 | Montaron | |
| 6,769,497 B2 | 8/2004 | Dubinsky et al. | |
| 7,295,928 B2 | 11/2007 | Hassan et al. | |
| 7,358,725 B2 | 4/2008 | Blanz | |
| 7,558,675 B2 | 7/2009 | Sugiura | |
| 7,823,658 B2 | 11/2010 | Hartmann et al. | |
| 8,571,796 B2 * | 10/2013 | Van Os et al. ..................... | 702/6 |
| 2002/0198661 A1 | 12/2002 | Strickland | |

(Continued)

OTHER PUBLICATIONS

Notification of Transmittal of the International Search Report and the Written Opinion of the International Searching Authority, or the Declaration; PCT/US2012/052080; Jan. 25, 2013.
Allouche et al. "High-resolution Images and Formation Evaluation in Slim Holes from a New Logging-While-Drilling Azimuthal Laterolog Device," SPE 131513. SPE EUROPEC/EAGE Annual Conference and Exhibition, Jun. 14-17, 2010, Barcelona, Spain. pp. 1-10.
Leine, R.I. et al., "Stick Slip Vibrations Induced by Alternate Friction Models", Jan. 1998, vol. 16, 41-54, Nonlinear Dynamics. pp. 1-.
Leine, R.I., Stick-slip Whirl Interaction in Drillstring Dynamics, 2002, vol. 124, Issue 2, Springer Netherlands.pp. 1-10.

*Primary Examiner* — Daniell L Negron
*Assistant Examiner* — Benyam Haile
(74) *Attorney, Agent, or Firm* — Cantor Colburn LLP (57) ABSTRACT A method of processing downhole measurement data includes: receiving formation measurement data generated by a downhole tool during a logging-while drilling operation over a selected time period; receiving a measured depth corresponding to the selected time period based on data taken at a surface location; receiving tool rotation data generated by measurements of a rotational rate of the downhole tool taken by a downhole sensor during the selected time period; calculating a new depth of the tool as a function of time over the selected time period based on a relationship between the tool rotation data and the measured depth; and correcting an original depth of the measurement data with the new depth.

20 Claims, 6 Drawing Sheets

(56) References Cited

U.S. PATENT DOCUMENTS

| | | |
|---|---|---|
| 2005/0060096 A1 | 3/2005 | Hutchinson |
| 2005/0087367 A1 | 4/2005 | Hutchinson |
| 2009/0059722 A1 | 3/2009 | Priest |
| 2010/0023268 A1 | 1/2010 | Gold et al. |
| 2011/0031015 A1 | 2/2011 | Downton et al. |
| 2011/0068798 A1 | 3/2011 | Minerbo et al. |
| 2011/0102188 A1 | 5/2011 | Mehta et al. |

* cited by examiner

Imaging data during stick-slip, raw data and processed data.

SYSTEM AND METHOD FOR STICK-SLIP CORRECTION

BACKGROUND

Logging-while-drilling (LWD) tools are commonly used for determination of properties of formations surrounding a borehole. These logging tools provide various types of measurements, such as resistivity and gamma ray measurements, that can provide imaging data and can be interpreted to evaluate properties of the formation, including hydrocarbon liquids and gases, and other fluids therein.

High resolution imaging data is affected by stick-slip because changes in the rotational rate of logging tools affects the acquisition of measurement data used for formation imaging. Resultant gaps in measurement data require correction techniques such as interpolation, which can result in image artifacts and other distortions.

SUMMARY

A method of processing downhole measurement data includes: receiving formation measurement data generated by a downhole tool during a logging-while drilling operation over a selected time period; receiving a measured depth corresponding to the selected time period based on data taken at a surface location; receiving tool rotation data generated by measurements of a rotational rate of the downhole tool taken by a downhole sensor during the selected time period; calculating a new depth of the tool as a function of time over the selected time period based on a relationship between the tool rotation data and the measured depth; and correcting an original depth of the measurement data with the new depth.

A system for imaging a formation surrounding a wellbore during a drilling operation includes: a drill string including a downhole tool for collecting formation measurement data and a downhole sensor configured to measure a rotational rate of the downhole tool; and a processor configured to receive the formation measurement data, receive tool rotation data generated from the downhole sensor and receive measured depth data taken at a surface location. The processor is configured to perform: calculating a new depth of the tool as a function of time over the selected time period based on a relationship between the tool rotation data and the measured depth data; and correcting an original depth of the formation measurement data with the new depth.

A computer program product for processing downhole measurement data includes a tangible storage medium readable by a processing circuit and storing instructions for execution by the processing circuit for performing a method including: receiving measurement data generated by a downhole tool during a logging-while drilling operation over a selected time period; receiving a measured depth corresponding to the selected time period based on data taken at a surface location; receiving tool rotation data generated by measurements of a rotational rate of the downhole tool taken by a downhole sensor during the selected time period; calculating a new depth of the tool as a function of time over the selected time period based on a relationship between the tool rotation data and the measured depth; and correcting an original depth of the measurement data with the new depth.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Disclosed are methods and apparatus for estimating properties of an earth formation during drilling, and processing imaging data and/or other measured data generated from logging while drilling (LWD) or measurement while drilling (MWD) operations. In one embodiment, measurement data is corrected for by analyzing RPM data recorded by a measurement tool and rate of penetration (ROP) data taken at the surface to estimate an ROP of the tool and generate an estimation of depth as a function of time. For example, measurements affected by stick-slip can be corrected by removing the stick sections from the image and correcting the remaining data for depth using the estimated ROP. In one embodiment, a high resolution ROP data curve is constructed from low resolution surface ROP measurements and high resolution downhole RPM measurements. The resulting curve can be used for correcting the measurement data and may also be used for purposes of drilling dynamics.

Figure 1:
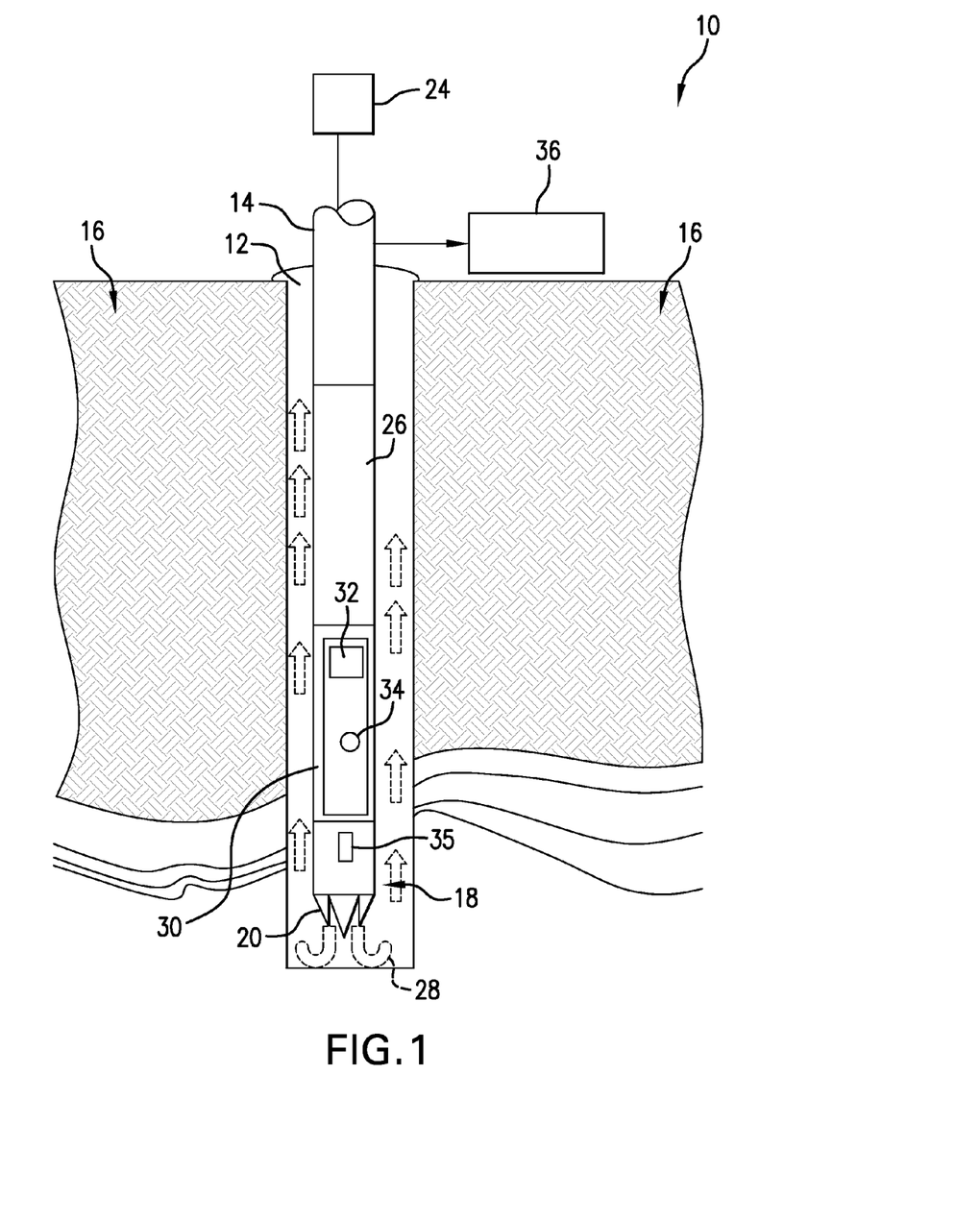
FIG. 1 illustrates an exemplary embodiment of a system including a drill string and a formation logging tool.

Referring to FIG. 1, an exemplary embodiment of a downhole drilling system 10 disposed in a borehole 12 is shown. A drill string 14 is disposed in the borehole 12, which penetrates at least one earth formation 16. The drill string 14 is made from, for example, a pipe or multiple pipe sections. The system 10 and/or the drill string 14 include a drilling assembly 18. Various measurement tools may also be incorporated into the system 10 to affect measurement regimes such as wireline measurement applications or logging-while-drilling (LWD) applications.

The drilling assembly 18, which may be configured as a bottomhole assembly (BHA), includes a drill bit 20 that is attached to the bottom end of the drill string 14. The drilling assembly 18 is configured to be conveyed into the borehole 12 from a drilling rig 24. The drill string 14, in one embodiment, includes lengths of drill pipe 26 which drive the drill bit 20. In this example, the drill string 14 and the drill bit 20 also provide a flow of a drilling fluid 28, such as drilling mud.

The drill string 14 and/or the drilling assembly 18 generally include equipment for performing "measuring while drilling" (MWD), also referred to as "logging while drilling" (LWD). Performing MWD or LWD generally calls for operation of a logging tool such as a logging tool 30 that is incorporated into the drill string 14 and/or drilling assembly 18 and designed for operation while drilling. The logging tool 30 may include downhole electronics 32 for at least one of operational control and data analysis. The downhole electronics 32 may receive input from one or more sensors 34, and can perform functions such as data analysis, data storage and data transmission, as well as receiving and/or transmitting control signals. The downhole electronics 32 may include components such as a power supply, a processor, memory, storage, communications interfaces and others.

In one embodiment, the drill bit 20 and/or drilling assembly 18 includes one or more additional sensors and related circuitry for estimating one or more parameters relating to the drilling assembly 18. For example, the tool 30 and/or drilling assembly 18 may include a rotational sensor 35 such as a magnetometer. The additional sensors perform measurements associated with the dynamic motion of the drilling assembly 18 and/or the drill string 14 or a static parameter associated therewith, and may also be configured to measure environmental parameters such as temperature and pressure. Non-limiting example of measurements performed by the sensors include accelerations, velocities, distances, angles, forces, moments, and pressures.

A processing unit 36 is connected in operable communication with the drilling assembly 18 and/or logging tool 30, and may be located, for example, at a surface location, a subsea location and/or a surface location on a marine well platform or a marine craft. The processing unit 36 may also be incorporated with the drill string 14 or the logging tool 30, or otherwise disposed downhole as desired. The processing unit 32 may be configured to perform functions such as controlling the drilling assembly 18 and/or the logging tool 30, transmitting and receiving data, processing measurement data, and monitoring the drilling assembly 18. The processing unit 32 includes components such as a processor and a data storage device for storing, data, models and/or computer programs or software. Various techniques may be used to transmit the data to the processing unit 36, such as mud pulse, electromagnetic, acoustic telemetry, or wired pipe.

Figure 2:
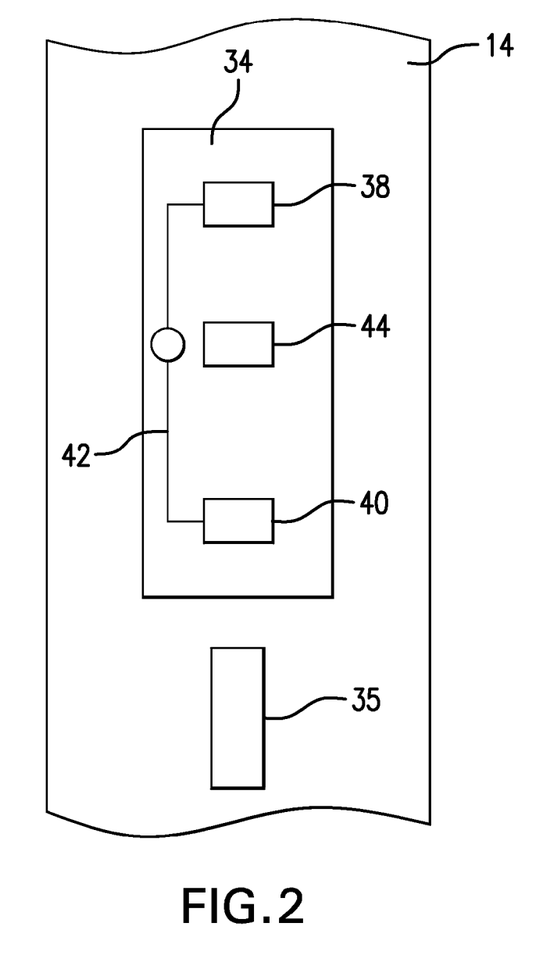
FIG. 2 illustrates an exemplary downhole formation measurement sensor.

Referring to FIG. 2, in one embodiment, the sensor 34 is configured to measure resistivity of the formation. Resistivity sensors normally operate as inductive sensors or galvanic sensors. One type of resistivity sensor is a galvanic resistivity sensor, an example of which is shown in FIG. 2, which is galvanically coupled directly to the earth formation with its electrodes. The sensor 34 measures formation resistivity by passing an electrical current between a current source electrode 38 on the sensor 34 and a current return electrode 40, and measuring electrical potential differences between the electrodes. Typically, a voltage drop across a resistor 42 is measured to derive information about the impedance encountered by the current between the measurement electrode 32 and the return electrode 36. For example, measured voltage/current (V/I) ratios are converted to apparent resistivities, using algorithms based upon the electrode array geometries and potential theory. Galvanic resistivity logs are useful, for example, for characterizing stratigraphy, making correlations between wells and inferring formation porosity. In one embodiment, the resistivity sensor 34 uses a focusing technique and includes one or more guard electrodes 44 configured to emit current in order to lead the current beam of the measurement electrode 32 deeper into the borehole and formation. Such a sensor is useful especially for high resistivity formations that are measured via boreholes having relatively low resistivity drilling mud therein. The focused resistivity sensors counteract the tendency of the current emitted by the measurement electrode 32 to flow into the low resistivity mud. Although specific numbers of electrodes are described herein, any number of electrodes may be utilized. Furthermore, the sensor 34 is not limited to the configurations described herein. For example, the sensor 34 may be a laterolog device or, instead of utilizing electrodes as shown in FIG. 2, may include transmitting and receiving antennas and/or coils.

Although the sensors described in the above embodiments are described as resistivity sensors, the LWD measurement devices are not so limited. Other exemplary sensing assemblies or tools suitable for the systems and methods described herein include, but are not limited to, magnetic resonance imaging (MRI), pulsed neutron, acoustic and gamma ray measurement tools. Similarly, although the logging data and analysis described herein is related to resistivity measurements, any data generated by an LWD sensor may be used, such as data generated by the sensors described herein.

Figure 3:
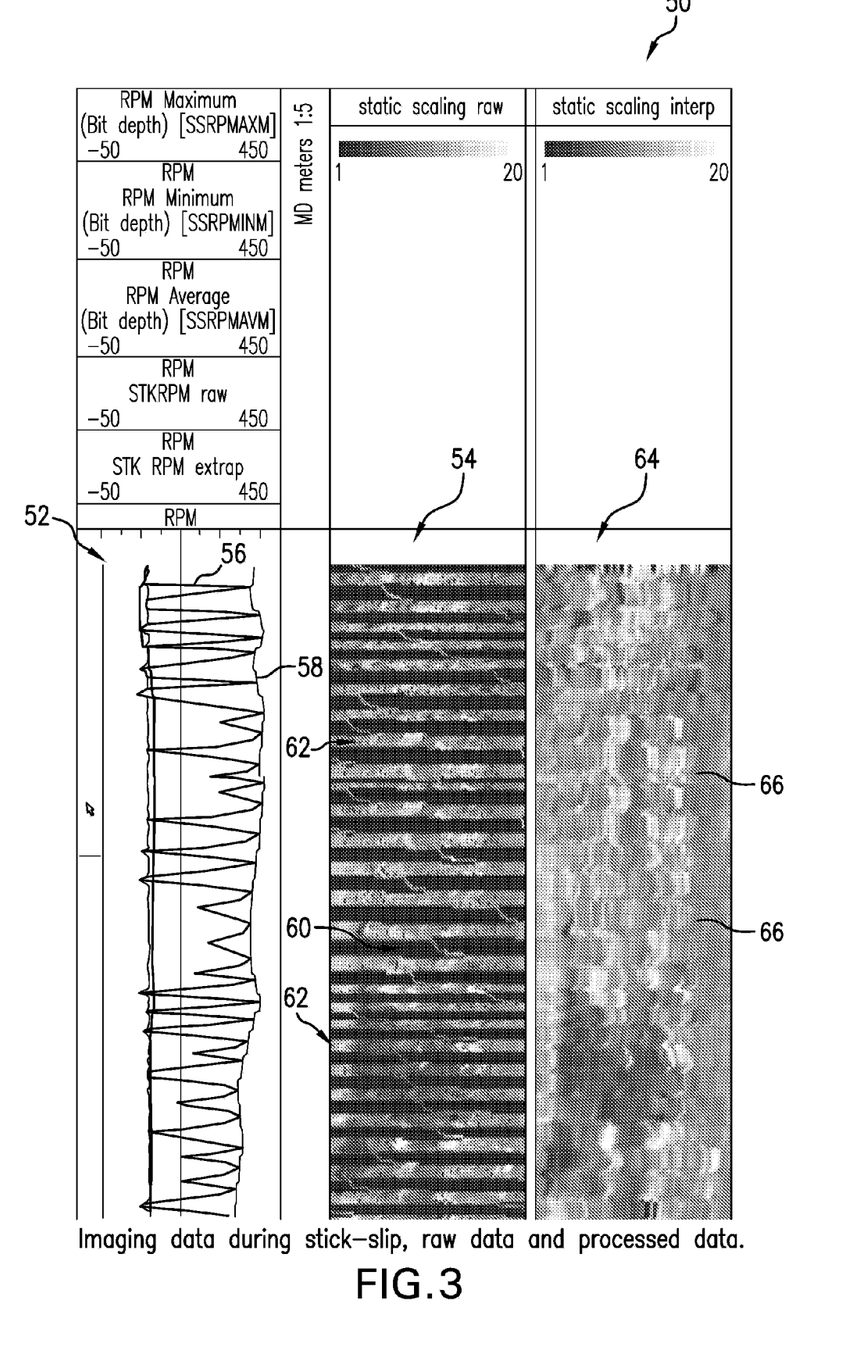
FIG. 3 illustrates exemplary formation imaging data.

FIG. 3 illustrates exemplary measurement data taken from a downhole LWD resistivity device such as the resistivity sensor 34. Imaging data 50 is shown, which includes both measured rotational data 52 and resistivity image data 54 over a selected time window. This data was taken during a drilling operation in which significant stick-slip was encountered. "Stick-slip" refers to a phenomenon in which the logging tool and/or drill bit movement is irregular due to the drill bit or tool being stuck in the borehole and then released. This results in raw logging measurements alongside zones of stick and slip being displayed at incorrect depths.

For example, during the sticking phase, the tool rotates slowly, as shown by revolutions per minute (RPM) data 56 measured downhole (at the tool depth). As can be seen by the RPM data 56, the rotational rate of the tool decreases significantly as the tool and/or drill bit is stuck in the borehole. During the slip phase, as the tool is released, the rotational rate increases to a maximum 58. Thus, during the stick phase, the tool does not rotate fast enough to generate useful image data, as shown by corresponding gaps 60. During the slip phase, the tool rotates fast enough to fully image the borehole wall during one timestamp, as shown by image data regions 62. In this example, the duration of one stick-slip event was about 4 to 6 seconds. It is also visible in this example that the stick and slip each represent roughly 50% of the total time. The variation in RPM of the tool corresponds with a variation in the rate of penetration (ROP) of the drill bit and tool, and thus the depth does not increase at a constant rate, as would be assumed by the image data 54. On the surface, low resolution ROP measurements (e.g., having a 15 sec sampling rate) typically utilized during drilling do not adequately show this variation in ROP of the tool.

As a result, imaging data has to be processed to account for the gaps 60 in the image data 54. Exemplary processed image data 64, processed by prior art techniques such as interpolation, produced a distorted depth-based image of the formation around the borehole. Thus, combining the high resolution image data 54 with the low resolution ROP or depth measurements taken at the surface leads to depth based gaps 60. Interpolation leads to artifacts or distortions such as horizontal stripes 66, as shown in the processed image data 64.

A method 60 of analyzing LWD measurement data is described that utilizes downhole measurements of the varying RPM of the tool to correct raw image data. An example of the method 60 is described in conjunction with image data taken from a tool that exhibits sinusoidally varying RPM, as shown in FIG. 4.

Figure 4:
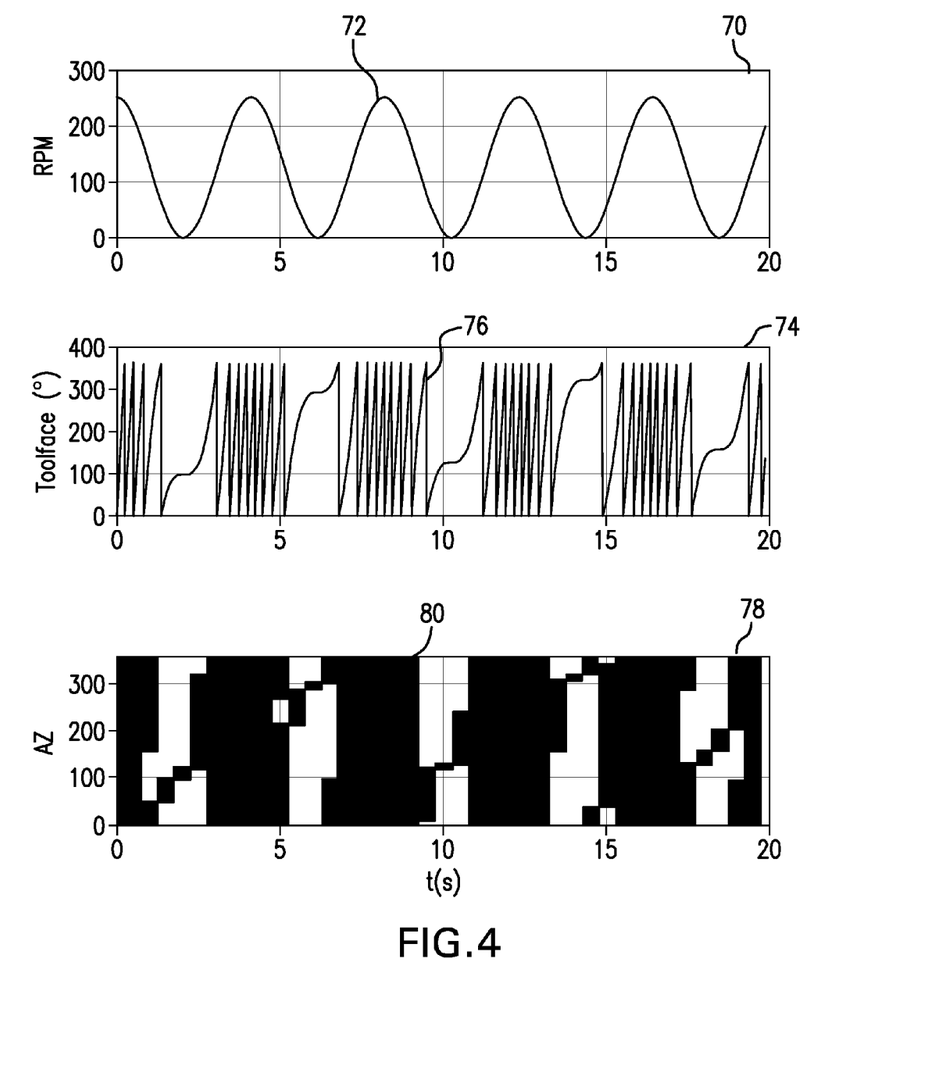
FIG. 4 illustrates data representing rotational behavior of a downhole formation measurement tool.

Referring to FIG. 4, a graph 70 illustrates tool RPM 72 that varies sinusoidal with a peak to peak amplitude of 250 RPM and a period of 4.1 s (top panel). Graph 74 shows the resulting toolface angle (TF°) 76 over time, toolface being defined as the plane angle of a fixed point on the tool, typically the sensor, relative to a predefined direction, typically the top of the borehole. Graph 78 is an image 80 of the toolface path corresponding to the toolface angle 76, binned with 120 sectors and 0.5 s time resolution. Black bins denote filled bins, and white bins denote empty bins. It is noted that the resolutions, sampling times, as well as the RPM variations, maxima and minimums are not limited to the embodiments described herein.

In this example, the drill bit is not cutting rock for at least some portion of the sticking phase, i.e. ROP=0. The ROP then increases to a maximum in the slip phase, creating a cyclic variation in RPM and a corresponding cyclic variation in the ROP.

Figure 5:
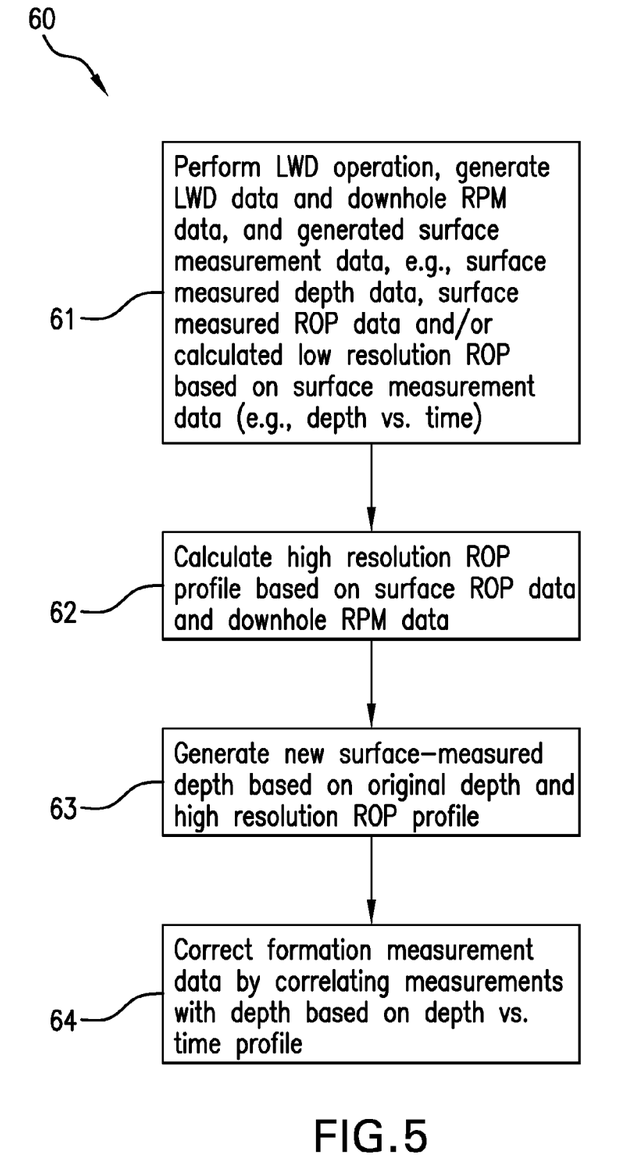
FIG. 5 is a flow chart providing an exemplary method of processing downhole measurement data.

FIG. 5 illustrates the method 60 of analyzing LWD measurement data from a drilling operation. The method 60 includes one or more stages 61-64. Although the method 60 is described in some examples as being performed in conjunction with the system 10 and/or the sensor 34, the method 60 is not limited to use with these embodiments. In one embodiment, the method 60 includes the execution of all of stages 61-64 in the order described. However, certain stages may be omitted, stages may be added, or the order of the stages changed.

The method 60 combines high resolution RPM data from the logging tool 30 (or any tool capable of measuring RPM with a time resolution that is at least as high as the time resolution (e.g., sampling time window) of formation logging or imaging data, and combine the RPM data with surface ROP measurements to generate a high resolution ROP measurement. This high resolution ROP measurement can then be used to correct the image data for the artifacts of the variable.

In the first stage 61, a drilling and LWD operation is performed, for example, via the system 10 and the tool 30. Resistivity or other measurement data is taken over selected time windows during a duration of the drilling to generate raw measurement data. Rotational rate (e.g., RPM) of the tool during the duration of the drilling and/or during selected time periods is measured via a suitable sensing device (e.g., the magnetometer 35) and/or received. In addition, measured depth data is taken at a surface location during the duration of the drilling and/or received, and corresponds to selected time periods or windows. The measured depth data may include ROP measurements taken at the surface location. In one embodiment, surface ROP data is calculated based on surface measured depth vs. time.

In the second stage 62, the RPM measurements and the measured depth/ROP data are analyzed to calculate a new depth of the tool as a function of time over the selected time period based on a relationship between the tool rotation data and the measured depth data. In one embodiment, the RPM measurements and surface depth measurements are analyzed to generate a depth model, curve or other depth data over the one or more time windows within the duration. An exemplary time window (tw) is a time window corresponding to a sampling time window of the surface ROP measurement data.

A time-depth profile of the LWD measurement process is performed by defining a time based window length "tw" (e.g., approximately equal to the surface ROP sampling rate), and computing a function or constant based on a relationship between the ROP measured at the surface and downhole RPM measurements.

An exemplary algorithm or relationship between RPM and ROP, assuming that instantaneous ROP ("ROPi") is proportional to instantaneous RPM ("RPMi"), is represented by the following:

ROP$i$=$k$*RPM$i$.

In one embodiment, RPMi represents each RPM measurement taken by the magnetometer over the time window tw.

In one embodiment, k is computed by determining an average surface ROP (ROPavg) over tw from the surface ROP measurements, and determining and average RPM (RPMavg) over tw using high resolution RPM measurements taken from sensors such as the magnetometer 35 over tw. k is computed as a ratio between the average ROP and average RPM, i.e., k=ROPavg/RPMavg. The choice of k in this way ensures that the average of ROPi over a suitable time-interval will be equal to the average of ROPavg over the same time-interval. It is noted that this description of k is only an example, as any relational constant may be used that can correct for imaging data depth measurements.

The high resolution ROP (ROPi) profile is then calculated based on the above equation. A high-resolution measured depth vs. time curve or profile (MD) may be generated by integrating ROPi:

$$MD(t) = \int_0^t ROPi(t')dt'.$$

This calculation may be repeated for each measurement sampling window tw to generate and ROP profile over the drilling duration.

In the third stage 63, the ROP profile and/or depth profile is used to correlate the high-resolution measured depth of the tool with time over the duration of the drilling process or another selected time window. A time-depth profile may be generated to be used in correcting the measurement data. For example, new surface measured depth data is generated based on the original depth data (associated with the LWD data) and the high resolution time vs. depth profile, e.g., corrected depth=original depth from LWD data+high resolution profile. It is noted that the time-depth and ROP profiles may be generated based on various downhole measurements in addition to RPM, such as drilling dynamics measurements including, for example, weight on bit, torque, acceleration and others.

In the fourth stage 64, the original depth of the measured data (e.g., image data 54) is corrected by correlating the times of the measured data or sampling window with a depth based on the new time-depth profile, e.g., by tagging the LWD data with the new depths.

Figure 6:
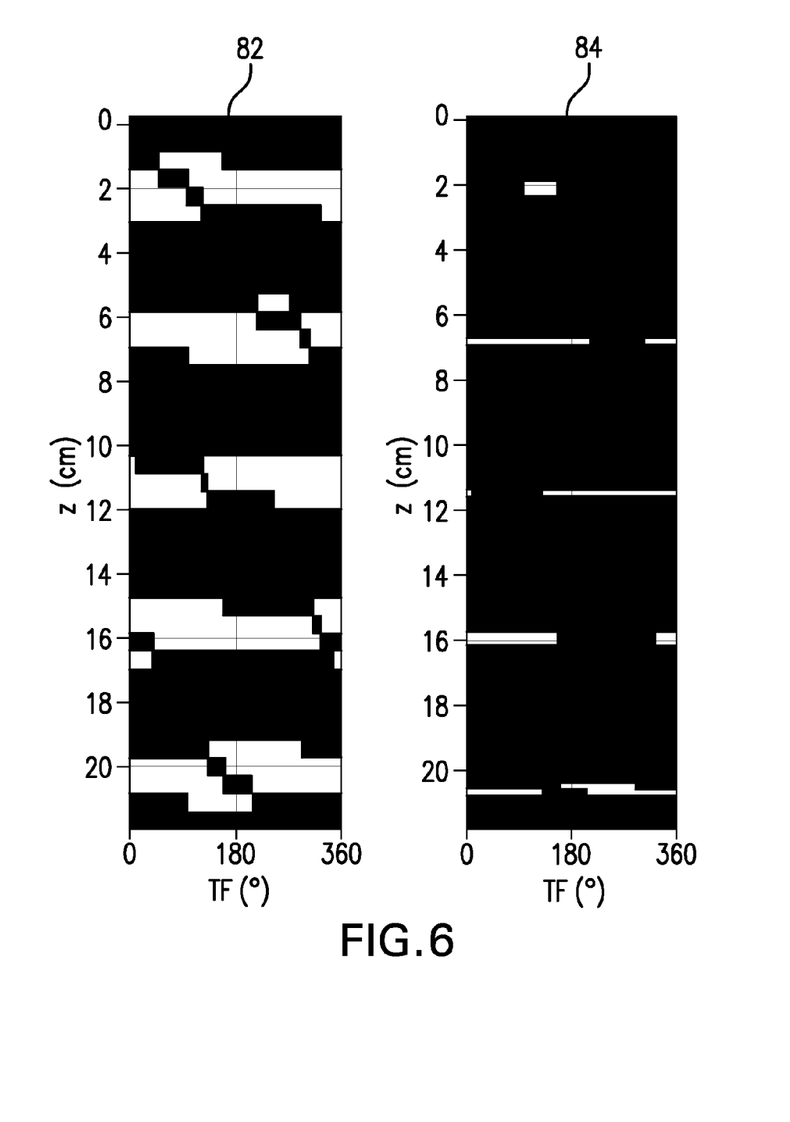
FIG. 6 illustrates data representing rotational behavior of a downhole formation measurement tool.

FIG. 6 illustrates the measured image depth using binned data corresponding to a tool rotating with a sinusoidally varying RPM. Graphic 82 shows a binned image representing depths "z" at which images are obtained, assuming an average ROP of 40 m/hr. Because of the low accuracy and resolution of surface-based depth measurements, the surface measured ROP over the section will be approximately constant, leading to large gaps in the depth based image as shown in graphic 82. Correcting measurement data based on an ROPi that is modified to represent a function of RPM shows a significantly higher coverage of image data, as is shown in graphic 84.

Thus, by analyzing RPM data recorded by the tool via the method 60, the stick sections can be removed from the image and corrected for. In principle a high resolution estimated ROP is constructed from low resolution surface ROP and high resolution downhole RPM measurements. It is noted that use of the computed relationship between ROP and RPM is not limited to correcting or processing the measurement data described herein. For example, the high resolution ROP data maybe also be used for drilling dynamics purposes, for instance to calibrate stick-slip models, or derive other mechanical parameters of a drilling assembly or drill string.

The relationships between ROP and RPM are not limited to those described herein. Some examples described herein assume a linear relationship between ROP and RPM. However, this relationship may be more complicated and can be affected by factors such as drill bit characteristics, and changes in WOB and/or drill string length when the drill string is changing from a twisted to an untwisted state. These factors may be considered in computing a relationship between ROP and RPM. Thus, a variety of factors may be considered to derive some normalization of the high resolution RPM data to the surface ROP. Such normalization parameters (e.g., the constant "k") may be further modified by post-processing methods, such as a running average filter, blocking, or a minimum/maximum cutoff In addition, the ROP-RPM relationship may be derived based on non-local parameters to derive a function ROP=f(RPM), for example, by basing the function on the physics of the drilling process.

The systems and methods described herein provide various advantages over prior art techniques. For example, more accurate images and data from LWD measurements are provided by accurately correlating the readings with depth, with the image artifacts and distortion that accompany other data processing techniques.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the downhole electronics unit 42 or the processing unit 32. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force, or a rotational force), digital signal processor, analog signal processor, sensor, magnet, antenna, transmitter, receiver, transceiver, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

What is claimed is:

1. A method of processing downhole measurement data, the method comprising:
   receiving formation measurement data generated by a downhole tool during a logging-while drilling operation over a selected time period;
   receiving a measured depth corresponding to the selected time period based on data taken at a surface location;
   receiving tool rotation data generated by measurements of a rotational rate of the downhole tool taken by a downhole sensor during the selected time period, the tool rotation data taken independent of the formation measurement data;
   computing a rate of penetration (ROP) profile based on a mathematical relationship between the rotational rate and ROP;
   generating a depth profile based on the ROP profile, the depth profile indicating depth as a function of time;
   calculating a new depth of the tool as a function of time over the selected time period based on the depth profile; and
   correcting an original depth of the formation measurement data with the new depth.

2. The method of claim 1, wherein receiving the measured depth includes receiving rate of penetration (ROP) data generated by measurements of a ROP of the downhole tool taken at the surface location during the selected time period.

3. The method of claim 1, wherein the relationship is represented by the following equation:
   ROPi=k*RPMi,
   wherein "ROPi" is an instantaneous ROP of the tool, RPMi is an instantaneous rotational rate of the tool, and "k" is a constant.

4. The method of claim 3, wherein "k" is a ratio between the tool rotation data and the ROP data.

5. The method of claim 3, wherein "k" is a constant represented by the following:
   k=ROPavg/RPMavg,
   wherein ROPavg is an average of the measurements of the ROP taken during the selected time period, and RPMavg is an average of the rotational rate measurements taken during the selected time period.

6. The method of claim 1, wherein the formation measurement data is generated at a first sampling rate, the rotational rate measurements are taken at a second sampling rate that is equal to or greater than the first sampling rate, the ROP measurements are taken at a third sampling rate that is less than the first sampling rate, and the selected time period is a time window "tw" based on the third sampling rate of the ROP data.

7. The method of claim 6, wherein calculating the new depth includes:
   calculating an ROP value ("ROPi") based on the following equation:
   ROPi=k*RPMi,
   wherein "RPMi" is a value of each rotational rate measurement taken during the time window tw;
   integrating each calculated ROP value to generate a curve representing a change in ROP over the time window tw; and
   calculating a depth vs. time curve over the time window tw.

8. The method of claim 7, wherein the mathematical relationship is a direct relationship between ROP and rate of rotation.

9. A system for imaging a formation surrounding a wellbore during a drilling operation, the system comprising:
a drill string comprising a downhole tool for collecting formation measurement data and a downhole sensor configured to measure a rotational rate of the downhole tool; and
a processor configured to receive the formation measurement data, receive tool rotation data generated from the downhole sensor and receive measured depth data taken at a surface location, the tool rotation data taken independent of the formation measurement data, the processor configured to perform:
computing a rate of penetration (ROP) profile based on a mathematical relationship between the rotational rate and ROP;
generating a depth profile based on the ROP profile, the depth profile indicating depth as a function of time;
calculating a new depth of the tool as a function of time over the selected time period based on the depth profile; and
correcting an original depth of the formation measurement data with the new depth.

10. The system of claim 9, wherein the measured depth data includes rate of penetration (ROP) data generated by measurements of a ROP of the downhole tool taken at the surface location during the selected time period.

11. The system of claim 9, wherein the relationship is represented by the following equation:
ROPi=k*RPMi
wherein "ROPi" is an instantaneous ROP of the tool, RPMi is an instantaneous rotational rate of the tool, and "k" is a constant.

12. The system of claim 11, wherein "k" is a constant represented by the following:
k=ROPavg/RPMavg,
wherein ROPavg is an average of the measurements of the ROP taken during the selected time period, and RPMavg is an average of rotational measurements taken during the selected time period.

13. The system of claim 9, wherein the formation measurement data is generated at a first sampling rate, the rotational rate measurements are taken at a second sampling rate that is equal to or greater than the first sampling rate, the ROP measurements are taken at a third sampling rate that is less than the first sampling rate, and the selected period of time is a time window "tw" based on the third sampling rate of the ROP data.

14. The system of claim 13, wherein calculating the depth includes:
calculating an ROP value ("ROPi") based on the following equation:
ROPi=k*RPMi,
wherein "RPMi" is a value of each rotational rate measurement taken during the time window tw;
integrating each calculated ROP value to generate a curve representing a change in ROP over the time window tw; and
calculating a depth vs. time curve over the time window tw.

15. A computer program product for processing downhole measurement data, the computer program product including a tangible storage medium readable by a processing circuit and storing instructions for execution by the processing circuit for performing a method comprising:
receiving formation measurement data generated by a downhole tool during a logging-while drilling operation over a selected time period;
receiving a measured depth corresponding to the selected time period based on data taken at a surface location;
receiving tool rotation data generated by measurements of a rotational rate of the downhole tool taken by a downhole sensor during the selected time period, the tool rotation data taken independent of the formation measurement data;
computing a rate of penetration (ROP) profile based on a mathematical relationship between the rotational rate and ROP;
generating a depth profile based on the ROP profile, the depth profile indicating depth as a function of time;
calculating a new depth of the tool as a function of time over the selected time period based on the depth profile; and
correcting an original depth of the formation measurement data with the new depth.

16. The computer program product of claim 15, wherein receiving the measured depth includes receiving rate of penetration (ROP) data generated by measurements of a ROP of the downhole tool taken at the surface location during the selected time period.

17. The computer program product of claim 15, wherein the relationship is represented by the following equation:
ROPi=k*RPMi
wherein "ROPi" is an instantaneous ROP of the tool, RPMi is an instantaneous rotational rate of the tool, and "k" is a constant.

18. The computer program product of claim 17, wherein "k" is a constant represented by the following:
k=ROPavg/RPMavg,
wherein ROPavg is an average of the measurements of the ROP taken during the selected time period, and RPMavg is an average of rotational measurements taken during the selected time period.

19. The computer program product of claim 18, wherein computing the relationship includes: calculating an ROP value ("ROPi") based on the following equation:
ROPi=k*RPMi,
wherein "RPMi" is a value of each rotational rate measurement taken during the time window tw;
integrating each calculated ROP value to generate a curve representing a change in ROP over the time window tw; and
calculating a depth vs. time curve over the time window tw.

20. The computer program product of claim 19, wherein correcting includes correlating the formation measurement data with a depth based on a time value of each formation measurement data point.

* * * * *